US009702589B2

(12) United States Patent
Kim

(10) Patent No.: US 9,702,589 B2
(45) Date of Patent: Jul. 11, 2017

(54) COMBUSTION APPARATUS HAVING AIR INTAKE PREHEATER

(71) Applicant: KYUNGDONG NAVIEN CO., LTD., Pyeongtaek-si, Gyeonggi-do (KR)

(72) Inventor: Young Mo Kim, Gwangmyeong-si (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 75 days.

(21) Appl. No.: 14/648,898

(22) PCT Filed: Jan. 8, 2014

(86) PCT No.: PCT/KR2014/000175
§ 371 (c)(1),
(2) Date: Jun. 1, 2015

(87) PCT Pub. No.: WO2014/112740
PCT Pub. Date: Jul. 24, 2014

(65) Prior Publication Data
US 2015/0338127 A1 Nov. 26, 2015

(30) Foreign Application Priority Data

Jan. 18, 2013 (KR) ........................ 10-2013-0006062

(51) Int. Cl.
*F28D 9/00* (2006.01)
*F24H 9/00* (2006.01)
(Continued)

(52) U.S. Cl.
CPC ........... *F24H 9/0084* (2013.01); *F23C 7/002* (2013.01); *F23D 14/66* (2013.01); *F23L 15/00* (2013.01);
(Continued)

(58) Field of Classification Search
CPC ......... F23C 7/00; F24H 9/0084; F28D 9/0043
(Continued)

(56) References Cited

U.S. PATENT DOCUMENTS 4,502,626 A * 3/1985 Gerstmann ........ A61K 51/0476
122/14.3
4,653,466 A * 3/1987 DeHaan .................. F24H 8/006
126/110 R
(Continued)

FOREIGN PATENT DOCUMENTS

DE 40 26 823 A1 11/1991
JP S57-165948 4/1981
(Continued)

OTHER PUBLICATIONS

International Search Report dated Apr. 15, 2014, issued to the corresponding International Application No. PCT/KR2014/000175.

Primary Examiner — Gregory A Wilson
(74) Attorney, Agent, or Firm — Stein IP, LLC

(57) ABSTRACT

The present invention relates to a combustion apparatus capable of reducing the combustion load of a burner and improving the combustion efficiency thereof. The combustion apparatus includes: a premixing chamber for premixing external air, introduced through an air supply inlet, with a combustion gas; a blower for supplying a mixed air premixed in the premixing chamber toward a burner; a combustion chamber for burning the mixed air by ignition of the burner; a heat exchanger for heat exchange with room heating water by using the combustion heat of the combustion chamber; an exhaust gas discharging part for discharging an exhaust gas having passed through the heat exchanger; and a duct through which the exhaust gas having passed through the exhaust gas discharging part is discharged outside, wherein the combustion apparatus includes an air intake preheater for heat exchange between the (Continued)

exhaust gas discharged to the duct through the exhaust gas discharging part and the air supplied to the premixing chamber through the air supply inlet, the air intake preheater including a channel-forming member in which a plurality of unit plates are stacked with a predetermined interval therebetween to form an exhaust gas channel and an air intake channel therein that are separated from each other, are adjacent to each other, and are alternately arranged.

9 Claims, 11 Drawing Sheets

(51) Int. Cl.

| | | |
|---|---|---|
| *F23C 7/00* | (2006.01) | |
| *F24H 1/14* | (2006.01) | |
| *F23L 15/00* | (2006.01) | |
| *F23D 14/66* | (2006.01) | |
| *F28D 21/00* | (2006.01) | |
| *F23L 15/04* | (2006.01) | |

(52) U.S. Cl.
CPC .............. *F23L 15/04* (2013.01); *F24H 1/145* (2013.01); *F28D 9/0043* (2013.01); *F28D 21/0003* (2013.01); *F28D 21/0008* (2013.01); *F23C 2202/10* (2013.01); *F23L 2900/00* (2013.01); *F23L 2900/15021* (2013.01); *Y02E 20/348* (2013.01)

(58) Field of Classification Search
USPC ... 432/29, 72, 189, 203, 209, 219, 220, 221, 432/222, 223
See application file for complete search history.

(56) References Cited

U.S. PATENT DOCUMENTS

| | | | | |
|---|---|---|---|---|
| 4,693,233 A | * | 9/1987 | Meith | F23L 15/04 122/448.1 |
| 4,867,949 A | * | 9/1989 | Betz | B01D 53/864 165/104.16 |
| 5,385,299 A | * | 1/1995 | Zawada | F24B 5/021 126/110 R |
| 5,511,971 A | | 4/1996 | Benz et al. | 431/9 |
| 9,335,099 B2 | * | 5/2016 | Garret | F28D 9/0043 |
| 2002/0146359 A1 | * | 10/2002 | Lomax, Jr. | B01J 8/0005 423/652 |
| 2010/0313827 A1 | | 12/2010 | Moore | 122/37 |
| 2011/0139045 A1 | | 6/2011 | Zatti et al. | 110/188 |

FOREIGN PATENT DOCUMENTS

| | | |
|---|---|---|
| JP | S63-116098 A | 5/1988 |
| JP | H10-160112 A | 6/1998 |
| JP | 2002-267153 A | 9/2002 |
| JP | 2004-108640 A | 4/2004 |
| JP | 2007-57124 A | 3/2007 |
| JP | 2008-175513 A | 7/2008 |
| JP | 2008-185240 A | 8/2008 |
| KR | 2001-0056546 A | 7/2001 |
| KR | 20-2003-0011461 Y1 | 7/2003 |
| KR | 20-0320246 Y1 | 7/2003 |
| KR | 10-1215196 B1 | 12/2012 |
| WO | EP 0 835 416 | 4/1998 |
| WO | EP 1 643 200 A1 | 4/2006 |
| WO | EP 1 959 194 A1 | 8/2008 |

\* cited by examiner

COMBUSTION APPARATUS HAVING AIR INTAKE PREHEATER

CROSS-REFERENCE TO RELATED APPLICATIONS

This application is a national stage of International Application No. PCT/KR2014/000175, filed Jan. 8, 2014, which claims the benefit of priority to Korean Application No. 10-2013-0006062, filed Jan. 18, 2013, in the Korean Intellectual Property Office, the disclosures of which are incorporated herein by reference.

TECHNICAL FIELD

The present invention relates to a combustion apparatus having an air intake preheater, and more particularly, to a combustion apparatus having an air intake preheater in which air supplied to the air intake preheater is preheated by using waste heat of an exhaust gas discharged after heat-exchanged with heating water, and a portion of the exhaust gas recirculates to an air intake side to improve heat efficiency of a combustion apparatus and reduce a flame temperature, thereby reducing emission amounts of nitrogen oxide and carbon dioxide.

BACKGROUND ART

Combustion apparatuses such as boilers or water heaters are devices in which heating water in a sealing container is heated by a heat source to heat a desired area or supply hot water. The combustion apparatus is constituted by a burner burning mixed-gas in which a gas is mixed with air and a heat exchanger for transmitting combustion heat of a combustion gas to the heating water or direct water.

FIG. 1 is a schematic view of a combustion apparatus according to a related art. A condensing boiler is described as an example. The combustion apparatus 10 according to the related art includes a blower 11 suctioning external air to supply the air needed for combustion, a burner 12 for burning mixed-gas in which the air supplied through the blower 11 is mixed with a gas, a combustion chamber in which the mixed-gas is burnt, a sensible heat heat-exchanger 14 that absorbs combustion sensible heat generated from the combustion chamber 13, a latent heat heat-exchanger 15 that absorbs latent heat of vapor contained in a combustion product that is heat-exchanged in the sensible heat heat-exchanger 14, and a duct 16 through which the combustion product passing through the latent heat heat-exchanger 15 is discharged.

The heating water heated while passing through the sensible heat heat-exchanger 14 and the latent heat heat-exchanger 15 may be transferred to a heating consumption place through a supply tube 17 connected to one side of the sensible heat heat-exchanger 14 to transfer heat energy and then return to a return tube 18 connected to one side of the latent heat heat-exchanger 15. Then, the heating water returning to the return tube 18 may be introduced into the latent heat heat-exchanger 15 to condense vapor contained in a combustion product passing through the sensible heat heat-exchanger 14 to recover the latent heat.

Since the above-described combustion apparatus 10 according to the related art has a structure in which the external air is directly introduced into the blower 11 and supplied to the burner 12, when the external air supplied to the blower 11 has a relatively low temperature, a combustion load has to be increased to increase a temperature of the combustion sensible heat generated when the mixed-gas is burnt in the burner 12 up to a temperature range that is required to heat the heating water. Thus, the combustion apparatus is reduced in combustion efficiency, and also as fuel consumption increases, an emission amount of carbon dioxide ($CO_2$) increases.

Also, in the combustion apparatus 10 according to related art, since the heat-exchanged combustion gas is discharged as it is through the duct 16 into the atmosphere, an emission amount of nitrogen oxide ($NO_x$) increases due to a high temperature of the exhaust gas and a high flame temperature of the combustion gas to cause environmental contamination.

DISCLOSURE OF THE INVENTION

Technical Problem

The present invention has been suggested to solve the above-described limitation, and an object of the present invention is to provide a combustion apparatus in which air supplied from the outside is preheated by using waste heat of an exhaust gas and then is supplied to a blower to reduce a combustion load of a burner and improve combustion efficiency.

Another object of the present invention is to provide an eco-friendly combustion apparatus in which a portion of an exhaust gas recirculates to an air intake side by using a pressure difference due to a venturi structure to reduce a flame temperature and fuel consumption, thereby reducing emission amounts of nitrogen oxide and carbon dioxide.

Technical Solution

A combustion apparatus having an air intake preheater to realize the above-described objects of the present invention includes: a premixing chamber 210 in which external air introduced through an air intake hole 120 is pre-mixed with a combustion gas; a blower 240 supplying mixed-gas that is pre-mixed in the premixing chamber 210 to a burner; a combustion chamber 260 in which the mixed-gas is burnt by ignition of the burner; a heat exchanger 270 in which heating water is heat-exchanged with combustion heat of the combustion chamber 260; an exhaust gas discharge part 280 through which an exhaust gas passing through the heat exchanger 270 is discharged; a duct 290 through which the exhaust gas passing through the exhaust gas discharge part 280 is discharged to the outside; and an air intake preheater 100 in which the exhaust gas discharged from the duct 290 through the exhaust gas discharge part 280 is heat-exchanged with the air supplied to the premixing chamber 210 through the air intake hole 120, wherein the preheater 100 includes a channel defining member 160 in which a plurality of unit plates 160-1, 160-2, and 160-n are stacked on each other in a predetermined distance to adjacently alternately define exhaust gas channels 160c and air intake channels 160d separated from each other therein.

In this case, each of the unit plates 160-1, 160-2, and 160-n may be constituted by a first plate 161 and a second plate 162 bonded to each other so that the exhaust gas channel 160c is defined therein, and an exhaust gas channel 160c may be connected between the first plate 161 and the second plate 162 of the unit plates disposed adjacent to each other by an exhaust gas channel connection member 164, and an exhaust gas introduction tube 160a and an exhaust gas discharge tube 160b may be connected to the exhaust gas channel connection member 164 are defined in one side of the unit plate 160-1, and the air intake channel 160*d* may be defined in a space between the unit plates disposed adjacent to each other.

Also, first protrusions 163*a* and second protrusions 163*b* may respectively protrude from the first plate 161 and the second plate 162 on positions corresponding to each other at a predetermined distance so that protruding surfaces contact each other, and each of the first protrusions 163*a* and the second protrusions 163*b* between the unit plates disposed adjacent to each other has the same height as that of the exhaust gas channel connection member 164.

Also, the exhaust gas introduction tube 160*a* and the exhaust gas discharge tube 160*b* may be vertically spaced apart from each other in one side surface of the unit plate 160-1 disposed at one side of the unit plates 160-1, 160-2, and 160-*n*.

Also, the air intake preheater 100 may include a housing 110 in which the channel defining member 160 is mounted therein, and an air intake hole 120 to which external air is introduced and an air supply tube 130 from which the preheated air is discharged are respectively disposed on upper and lower ends of the housing 110, and an exhaust gas introduction hole 140 communicating with the exhaust gas introduction tube 160*a* and an exhaust gas discharge hole 150 communicating with the exhaust gas discharge tube 160*b* may be respectively defined in an one lower surface and an one upper surface of the housing 110.

Also, the first plate 161 and the second plate 162 may have convex shapes in an opposite direction. And a first flange part 161*a* and a second flange part 162*a* may be disposed on outer ends of the first plate 161 and the second plate 162, respectively. Here, the first flange part 161*a* may be coupled to the second flange part 162*a* by welding in order to bond the first plate 161 to the second plate 162.

Also, a fixing member 165 closely attached to an inner surface of the housing 110 to isolate the air intake channels 160*d* between the unit plates adjacent to each other from each other is disposed on an edge of each of the plurality of unit plates 160-1, 160-2, and 160-*n*.

Also, a flow direction of the exhaust gas passing through the exhaust gas channel 160*c* and a flow direction of the air passing through the air intake channel 160*d* may be defined in a counterflow direction.

Also, the premixing chamber 210 may have a venturi shape having a throat part reduced in section area between an inlet and outlet through which the air passes, and a gas supply part 214 supplying a combustion gas and a recirculation tube 230 may be connected to the throat part of the premixing chamber 210 so that a portion of the exhaust gas passing through the heat exchanger 270 is introduced thereto in proportional to a pressure difference according to a flow amount of the mixed-gas passing through the throat part.

Also, the premixing chamber 210 may be divided into a first passage 212 and a second passage 213 by a partition member 211 therebetween, and the combustion gas introduced through the gas supply part 214 may be supplied to a first gas introduction hole 214*a* connected to the first channel 212 and a second gas introduction hole 214*b* connected to the second channel 213, and a flow passage of the air and the gas passing through the first passage 212 may be in an opened state all the time, and a flow passage of the air passing through the second passage 213 and a flow passage of the gas, which is connected to the second passage 213 through the second gas introduction hole 214*b* may be opened and closed by a mixed-gas adjusting part 220.

Advantageous Effects

In the combustion apparatus having the air intake preheater according to the present invention, the air intake preheater in which the plurality of unit plates are stacked on each other to adjacently alternately define exhaust gas channels and air intake channels separated from each other may be disposed to reduce the combustion load of the burner and improve combustion efficiency.

Also, since a portion of the exhaust gas recirculates to the air intake side by using the pressure difference due to the venturi structure to reduce the flame temperature and fuel consumption, emission amounts of nitrogen oxide and carbon dioxide may be reduced to realize the eco-friendly combustion apparatus.

Figure 1:
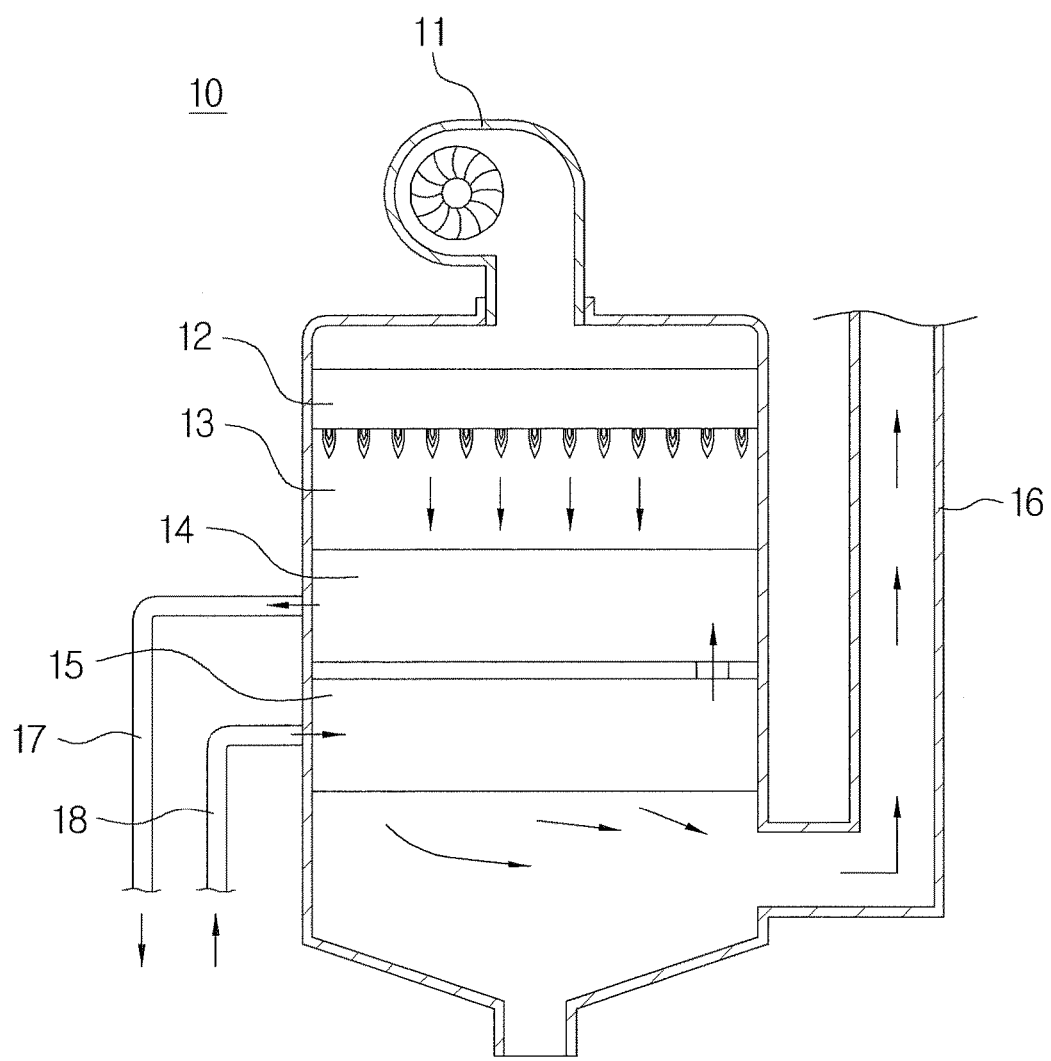
FIG. 1 is a schematic view of a combustion apparatus according to the related art.

|  Descriptions of reference numerals in the drawings  | |
|---|---|
| 100: Air intake preheater | 110: Housing |
| 110a: Upper housing | 110b: Lower housing |
| 120: Air intake hole | 130: Air supply tube |
| 140: Exhaust gas introduction hole | |
| 150: Exhaust gas discharge hole | |
| 160: Channel defining member | |
| 160-1, 160-2, 160-n: Unit plates | |
| 160a: Exhaust gas introduction tube | |
| 160b: Exhaust gas discharge tube | |
| 160c: Exhaust gas channel | 160d: Air intake channel |
| 161: First plate | 161a: First flange part |
| 162: Second plate | 162a: Second flange part |
| 163: Protrusion | 164: Exhaust gas channel connection member |
| 165: Fixing member | 210: Premixing chamber |
| 211: Partition member | 212: First passage |
| 213: Second passage | 214: Gas supply part |
| 215: Exhaust gas introduction hole | |
| 220: Mixed-gas adjusting part | |
| 230: Exhaust gas recirculation tube | |
| 240: Blower | |
| 241: Mixed-gas discharge hole | 250: Mixed-gas supply tube |
| 260: Combustion chamber | 270: Heat exchanger |
| 280: Exhaust gas discharge part | 290: Duct |

MODE FOR CARRYING OUT THE INVENTION

Hereinafter, components and effects of a combustion apparatus according to a preferred embodiment of the present invention will be described in detail with reference to the accompanying drawings.

Figure 2:
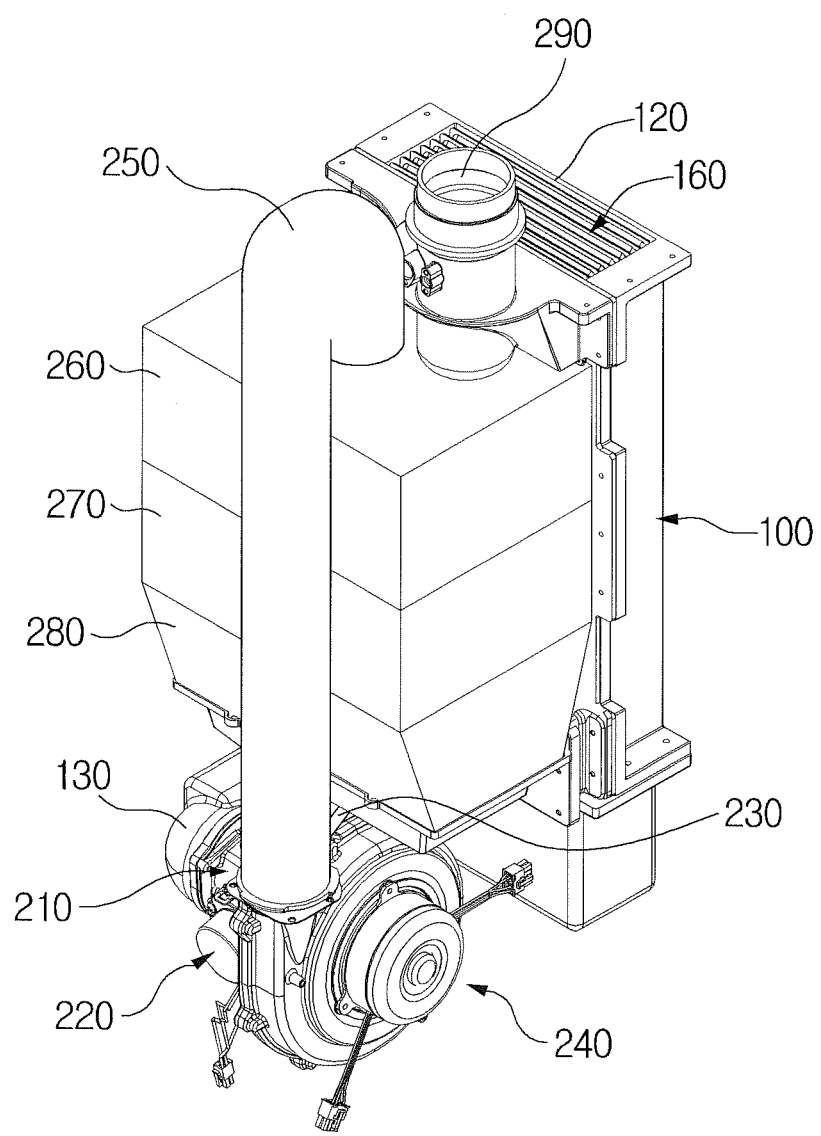
FIG. 2 is a perspective view of a combustion apparatus having an air intake preheater according to the present invention.

Referring to FIG. 2, the combustion apparatus according to the present invention includes a premixing chamber 210, a mixed-gas adjusting part 220 for adjusting an air-fuel ratio of the mixed-gas that is premixed in the premixing chamber 210 in proportional to a combustion load, a blower 240 supplying the mixed-gas of the premixing chamber 210 to a burner, a mixed-gas supply tube 250 through which the mixed-gas transferred from the blower 240 is supplied to the burner, a combustion chamber 260 in which the mixed-gas is burnt by ignition of the burner, a heat exchanger 270 in which heating water is heat-exchanged with combustion heat generated from the combustion chamber 260, an exhaust gas discharge part 280 from which an exhaust gas passing through the heat exchanger 270 is discharged, a duct 290 through which the exhaust gas passing through the exhaust gas discharge part 280 is discharged to the outside, and an air intake preheater 100 for preheating external air supplied thereto by using waste heat of the exhaust gas passing through the exhaust gas discharge part 280. Also, an exhaust gas recirculation tube 230 providing a channel so that a portion of the exhaust gas discharged via the exhaust gas discharge part 280 recirculates to the premixing chamber 210 is connected between the exhaust gas discharge part 280 and the premixing chamber 210.

Figure 3:
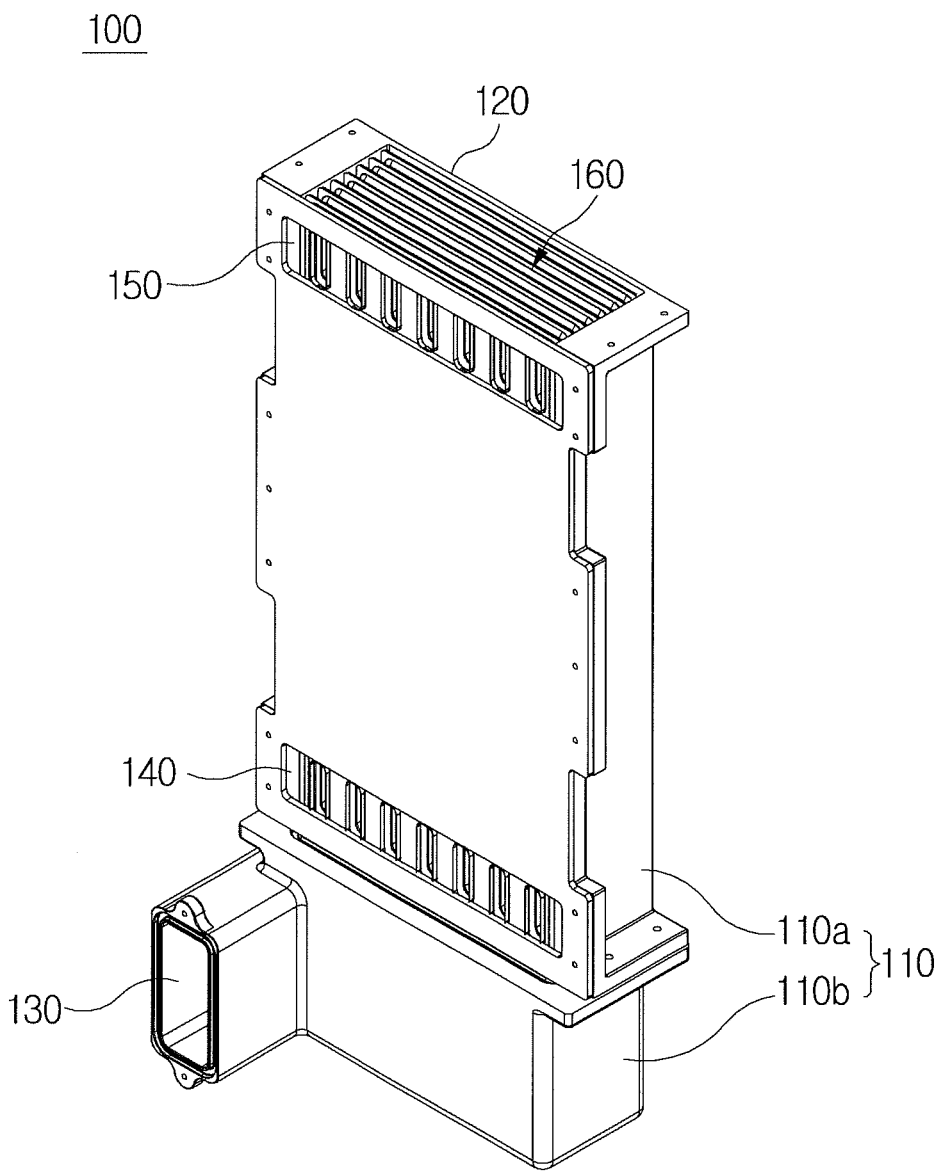
FIG. 3 is a perspective view illustrating an exploded air intake preheater of FIG. 2.
Figure 4:
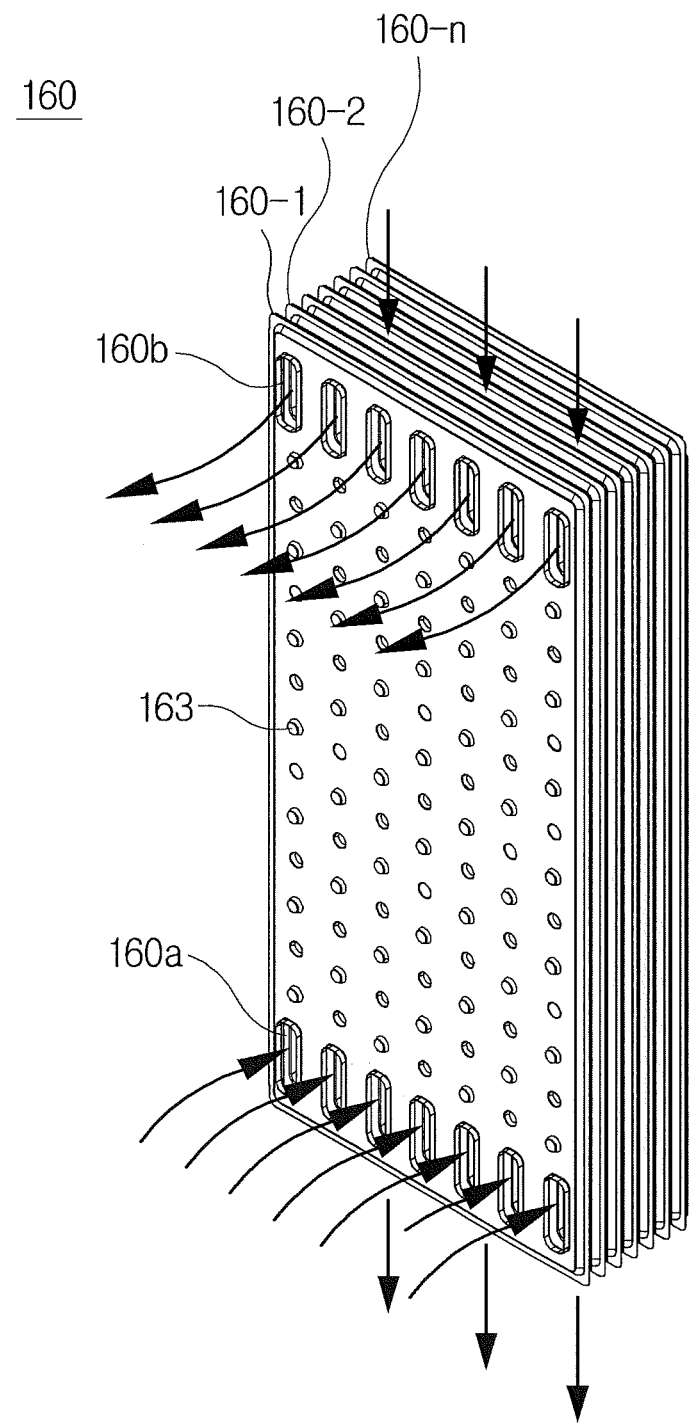
FIG. 4 is a perspective view of a channel defining member disposed in the air intake preheater.
Figure 5:
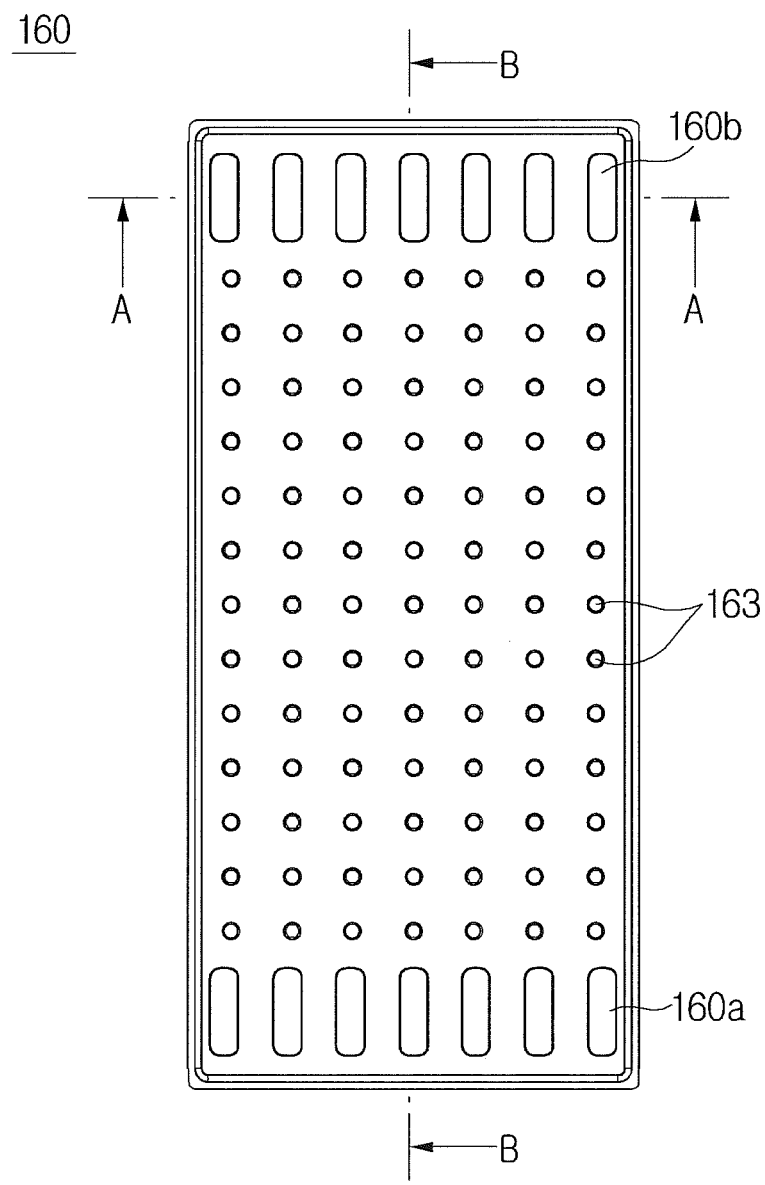
FIG. 5 is a front view of FIG. 4.
Figure 6:
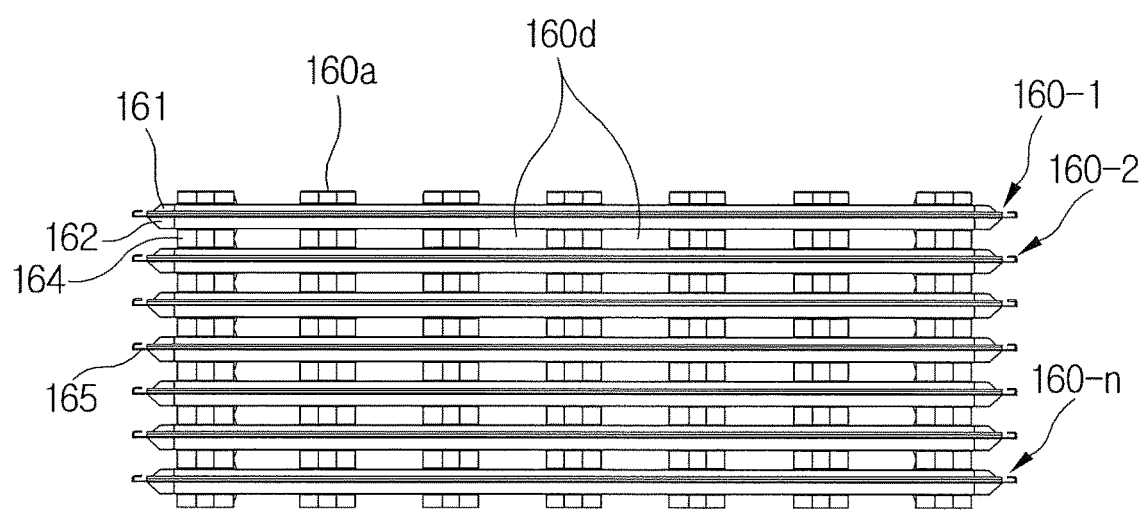
FIG. 6 is a plane view of FIG. 4.
Figure 7:
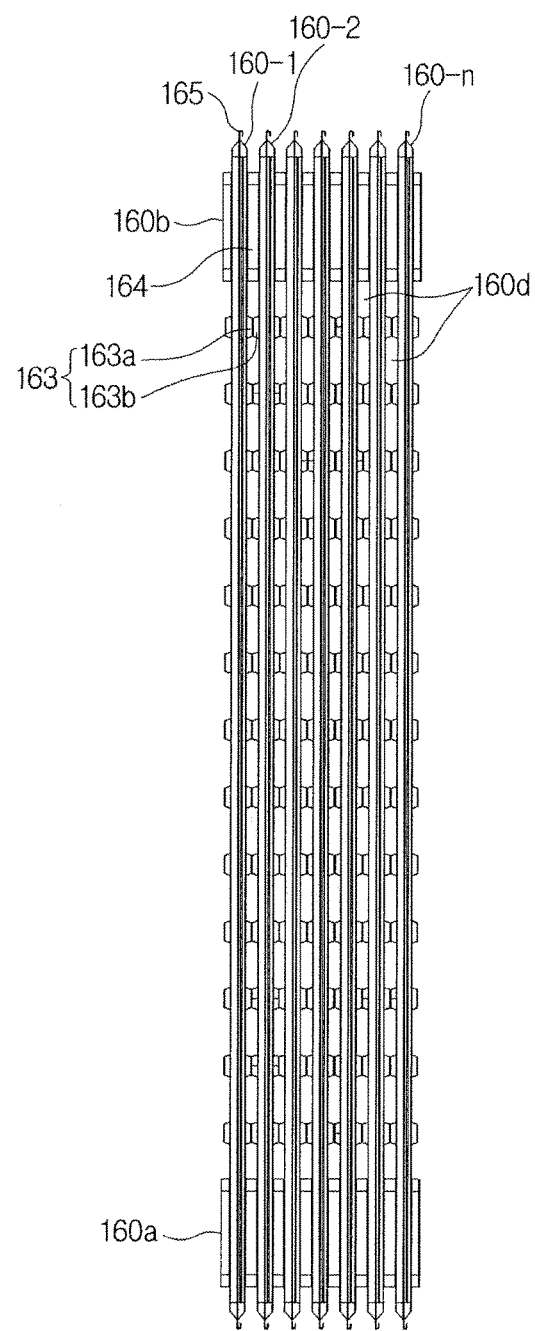
FIG. 7 is a right-side view of FIG. 4.

Referring to FIGS. 2 and 3, the air intake preheater 100 includes a housing 110 and a channel defining member 160 mounted in the housing 110.

The housing 110 is constituted by an upper housing 110a having opened upper and lower ends and a lower housing 110b communicating with a lower portion of the upper housing 110a and having one side to which an air supply tube 130 is connected. An opening defined in an upper end of the upper housing 110a defines an air intake hole 120 to which the external air is introduced. Also, an exhaust gas introduction hole 140 and an exhaust gas discharge hole 150 are defined in lower and upper portions of a front surface of the upper housing 110a, respectively.

Referring to FIGS. 4 to 9, the channel defining member 160 has a structure in which exhaust gas channels 160c defined by the exhaust gas that is introduced through the exhaust gas introduction hole 140 and discharged through the exhaust gas discharge hole 150 and air intake channels 160d defined by the air that is introduced through the air intake hole 120 and discharged through the air supply tube 130 are separated from each other and alternately disposed to adjacent to each other.

The channel defining member 160 has a structure in which a plurality of unit plates 160-1, 160-2, and 160-n are spaced a predetermined distance apart from each other and stacked on each other in a transversal direction. Each of the unit plates 160-1, 160-2, and 160-3 is constituted by a first plate 161 and a second plate 162 bonded to each other so that the exhaust gas channel 160c is defined therein. Here, the exhaust gas channels 160c are connected to each other between the first and second plates 161 and 162 of the unit plates disposed adjacent to each other by an exhaust gas channel connection member 164. An exhaust gas introduction tube 160a and an exhaust gas discharge tube 160b connected to the exhaust gas channel connection part 164 are defined in lower and upper portions of one side of the unit plate 160-1, respectively.

Also, a space between the first and second plates 161 and 162 of the unit plates disposed adjacent to each other may be maintained in distance by protrusions 163 (163a and 163b). The first and second protrusions 163a and 163b protrude from the first and second plates 161 and 162 on positions corresponding to each other at a predetermined distance. Here, protruding surfaces of the first and second protrusions 163a and 163b contact each other. The first and second protrusions 163a and 163b between the unit plates disposed adjacent to each other have the same height as that of the exhaust gas channel connection member 164. Thus, the unit plates disposed adjacent to each other may be uniformly maintained in distance therebetween and firmly assembled with each other.

Each of the air intake channels 160d is defined by a space between the unit plates disposed adjacent to each other. Thus, the exhaust gas channel 160c and the air intake channel 160d are adjacently alternately defined to widely secure a heat transfer area between the exhaust gas and the air.

Figure 8:
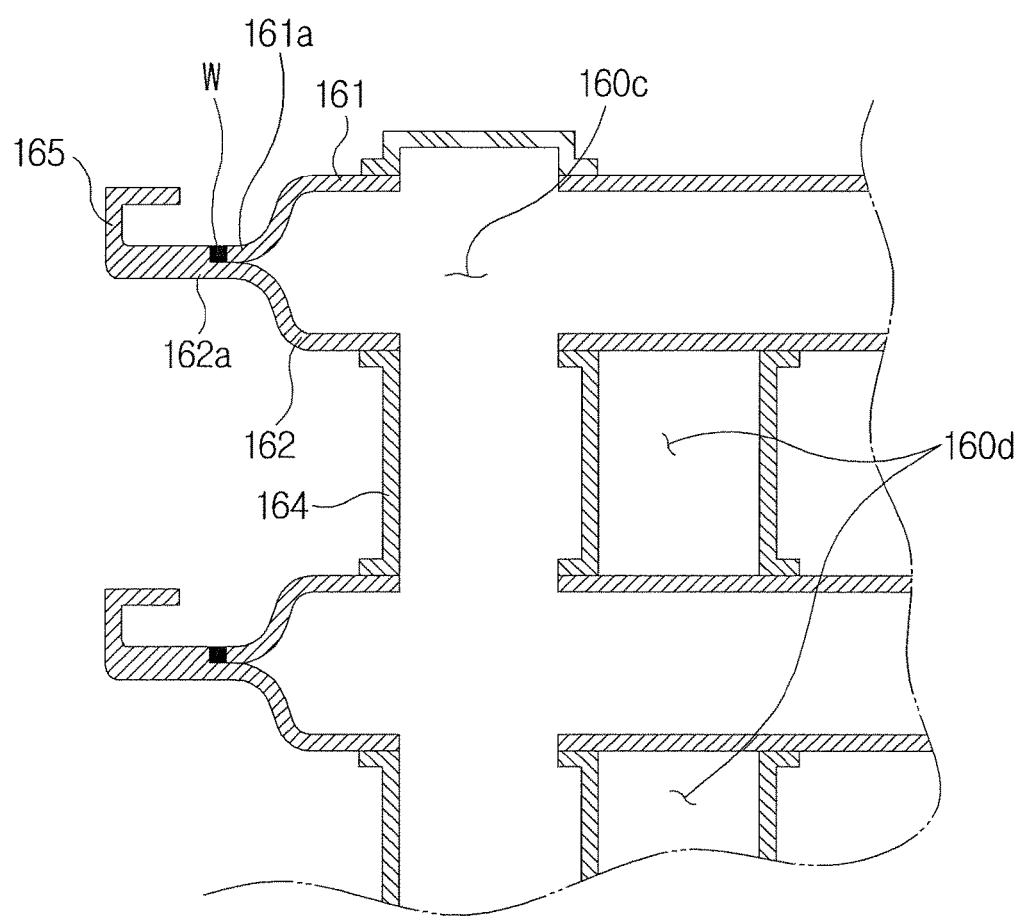
FIG. 8 is a partial cross-sectional view taken along line A-A of FIG. 5.

Referring to FIG. 8, the first and second plates 161 and 162 have convex shapes in an opposite direction to allow the exhaust gas channel 160c to be defined therein. The first plate 161 includes a first flange part 161a on an outer end thereof, and the second plate 162 also includes a second flange part 162a on an outer end thereof. Here, the first flange part 161a may be coupled to the second flange part 162a by welding in order to bond the first plate 161 to the second plate 162. Reference symbol 'W' represents a wending portion between the first flange part 161a and the second flange part 162a.

Also, a fixing member 165 closely attached to an inner surface of the housing 110 to isolate the air intake channels 160d of the adjacent unit plates from each other is disposed on an edge of each of the plurality of unit plates 160-1, 160-2, and 160-n. Since the fixing member 165 has a curved structure in which the fixing member 165 extends from an end of the second plate 162 to surface-contact the inner surface of the housing 110, when the channel defining member 160 is inserted into the housing 110, the channel defining member 160 and the housing 110 may be firmly assembled with each other by the fixing member 165.

Figure 9:
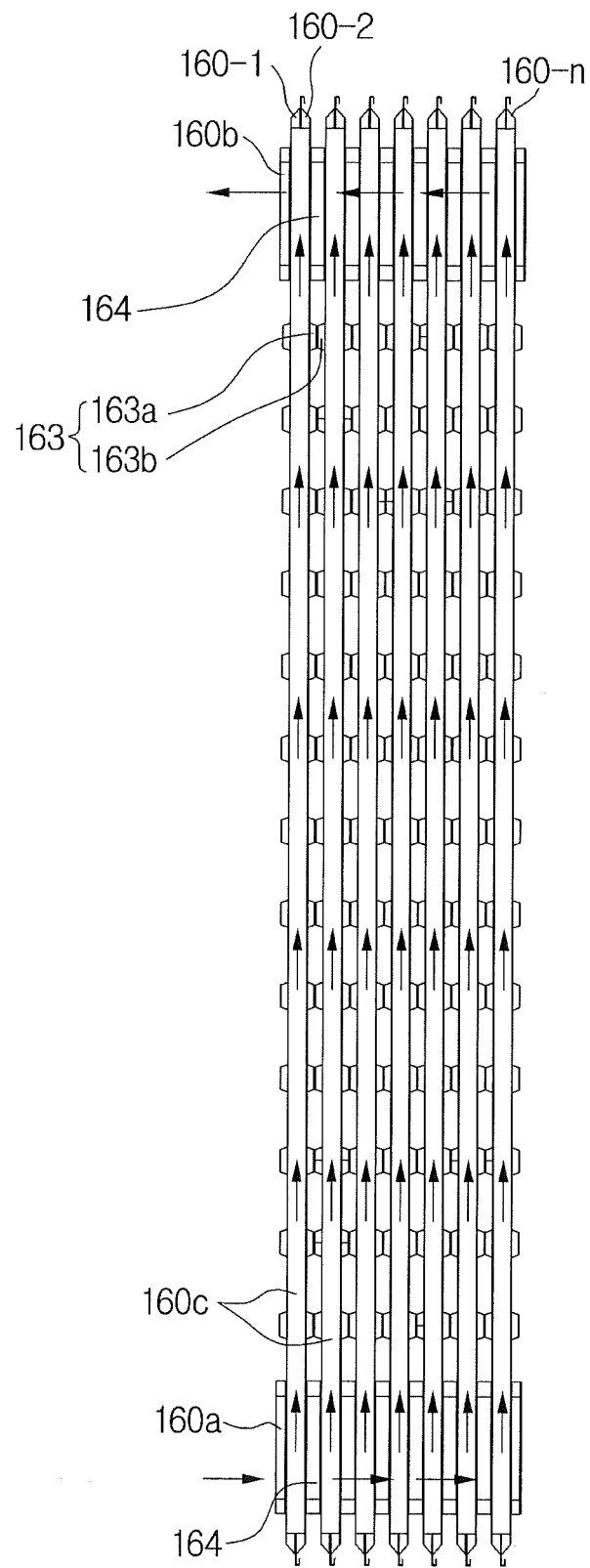
FIG. 9 is a cross-sectional view taken along line B-B of FIG. 5.

Referring to FIG. 9, the exhaust gas introduced through the exhaust gas introduction tube 160a is introduced to inner spaces of the plurality of unit plates surrounded by the first and second plates 161 and 162 through the exhaust gas channel connection member 164 to flow upward and then is collected by the exhaust gas channel connection member 164 disposed at an upper side to pass through the exhaust gas discharge tube 160b and discharged to the outside through the duct 290.

At the same time, the external air introduced through the air intake hole 120 passes through spaces defined between the unit plates 160-1, 160-2, and 160-n to flow downward and then is supplied toward the premixing chamber 210 through the air supply tube 130 disposed on the housing 110b.

Like this, since a flow direction of the exhaust gas passing through the exhaust gas channel 160c and a flow direction of the air passing through the air intake channel 160d are defined in a counterflow direction that is an opposite direction to each other, heat exchange efficiency in which the waste heat of the exhaust gas is transmitted to the intake air may be improved. Also, since the channel defining members 160 are alternately disposed adjacent to each other in a predetermined pattern in a state in which the plurality of unit plates 160-1, 160-2, and 160-3 are stacked on each other so that the exhaust gas channel 160c and the air intake channel 160d are separated from each other therein, the heat transfer area may be widely secured, and the preheater may be reduced in volume, and thus the combustion apparatus may be manufactured in small size.

According to the present invention, there is technical characteristics in that the external air is preheated by the above-described air intake preheater 100, and a portion of the exhaust gas recirculates to the air intake side in proportional to the supplied heat source.

Figure 10:
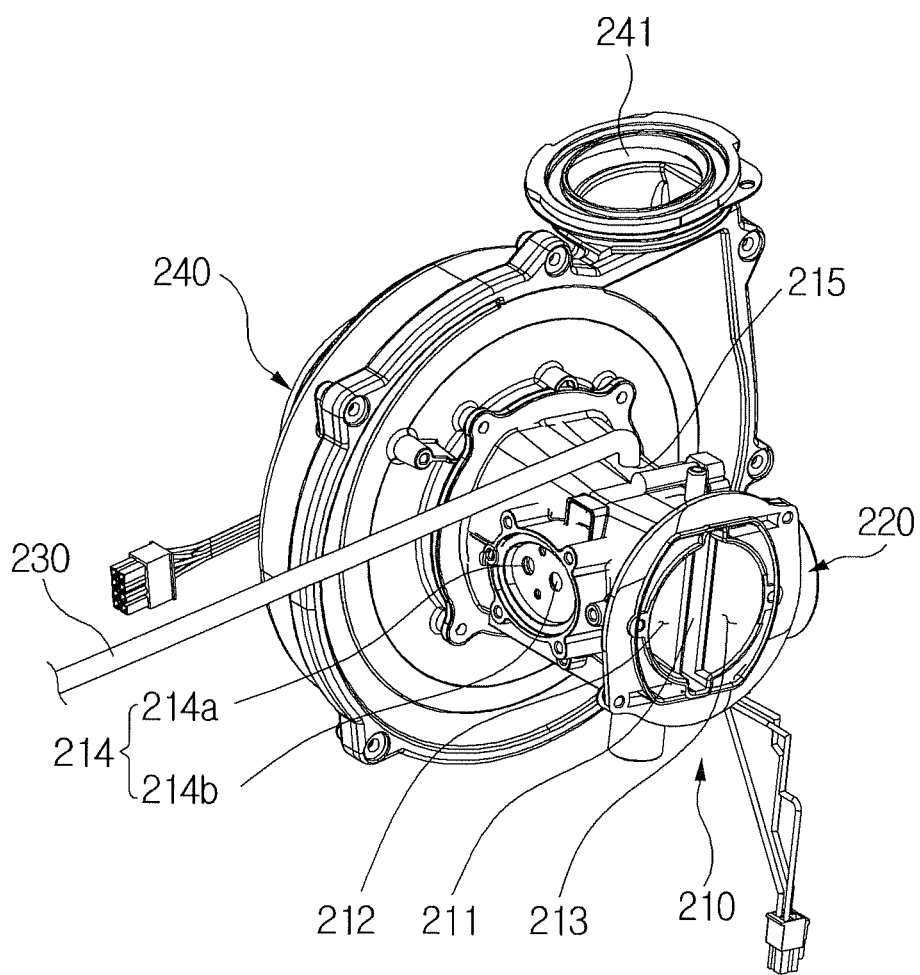
FIG. 10 is a perspective view of a premixing chamber and a blower.
Figure 11:
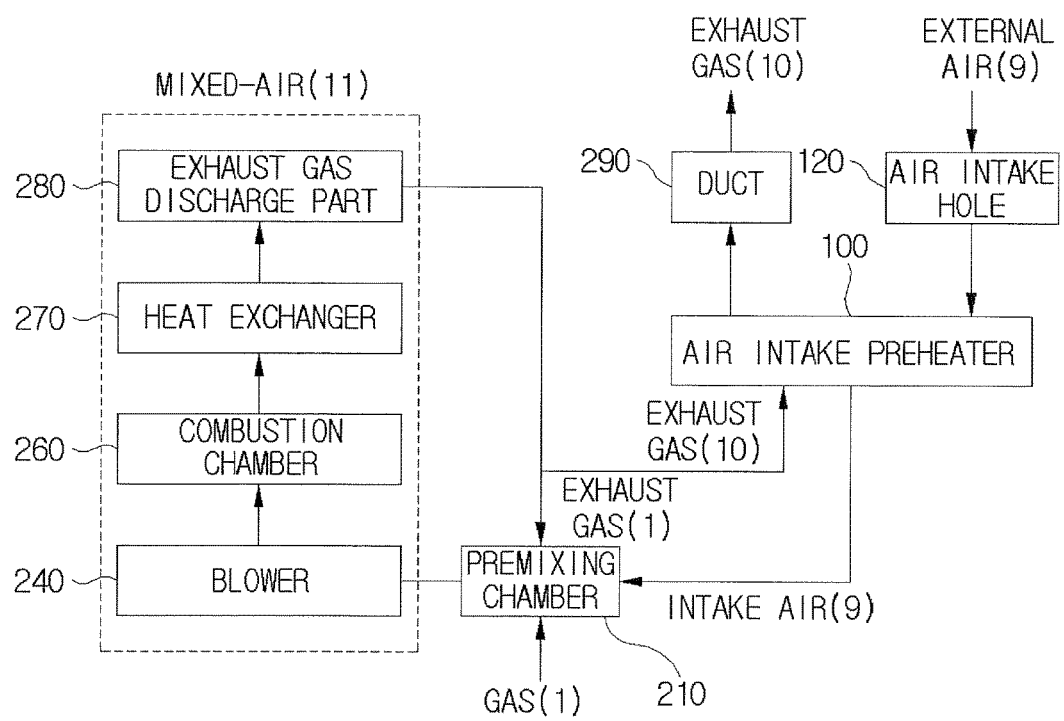
FIG. 11 is a block diagram showing an exhaust gas recirculation structure.

Referring to FIGS. 10 and 11, the premixing chamber 210 is connected to an inlet-side of the blower 240. An inner space of the premixing chamber 210 is divided into a first passage 212 and a second passage 213 by a partition member 211. The premixing chamber 210 has a venturi shape having a throat part reduced in section area on a central portion between an inlet to which the air is introduced and an outlet through which the mixed-gas is discharged to the blower 240. That is, the premixing chamber 210 has a shape in which each of the inlet and outlet of the air has a relatively large section area, and a section area gradually decreases from the inlet and outlet to the throat part on the central portion of the premixing chamber 210.

A gas supply part 214 connected to a gas supply tube for combustion (not shown) is disposed on one side of the throat part of the premixing chamber 210. Also, a mixed-gas adjusting part 220 is disposed on the other side of the throat part. An exhaust gas introduction hole 215 connected to the exhaust gas recirculation tube 230 is defined in a side of the throat part except for the one and the other sides of the throat part.

A first gas supply hole 214a connected to the first channel and a second gas supply hole 214b connected to a second passage 213 are defined in the gas supply part 214.

The first passage 212 of the premixing chamber 210 has a channel through which the air and the gas flow in an opened state all the time. Also, a channel through which the air and the gas flow of the second passage 213 is opened when the combustion load is more than a predetermined load and closed when the combustion load is less than the predetermined load by an operation of the mixed-gas adjusting part 220. The mixed-gas adjusting part 220 may include a damper (not shown) rotating by a motor or moving forward and backward by a solenoid to open and close the second passage 213.

The exhaust gas recirculation tube 230 provides a channel of the exhaust gas so that a portion of the heat-exchanged exhaust gas recirculates to be introduced into the premixing chamber 210. An inlet part of the exhaust gas recirculation tube 230 may pass through the heat exchanger 270 and connected to a predetermined position between the exhaust gas discharge part 280 and the duct 290. The exhaust gas introduction hole 215 may be defined in each of the first and second channels 212 and 213 in the throat part of the premixing chamber 210 or be defined to pass through the first and second channels 212 and 213.

The mixed-gas in which the air, the combustion gas, and the recirculated exhaust gas are pre-mixed in the premixing chamber 210 may be suctioned into the blower 240 by rotation of a fan disposed in the blower 240 and be supplied to a mixed-gas supply tube 250 through a mixed-gas discharge hole 241.

Like this, according to the premixing chamber 210 having a venturi shape and the structure in which the gas supply part 214 and the exhaust gas recirculation tube 230 are connected to the one side of the throat part, the air passing through the throat part has a flow rate that is relatively higher than that of the air at each of the inlet and outlet and a pressure that is lower than that of each of the inlet and outlet, and thus a pressure difference may occur between the inlet and outlet and the throat part. Also, when the air is adjusted in flow amount by controlling RPM of the blower 240, the air, gas, and the exhaust gas introduced into the throat part where having a relatively low pressure due to the pressure difference are also proportionally controlled in flow amount so that the flow amount is maintained in a predetermined air-fuel ratio.

Referring to FIG. 11, when it is assumed that a flow amount of the air supplied from the outside is 9, and a flow amount of the gas is 1, and a total flow amount of the exhaust gas discharged after the combustion is 11, and a flow amount of the recirculating exhaust gas is 1, a flow amount of the mixed-gas used for combustion and heat exchange is 11 on an area marked with a dotted line. Thus, heat efficiency may be improved, and the fuel consumption may be reduced, by the increased flow amount of the mixed-gas. Thus, costs and emission of carbon dioxide may be reduced. Also, since a portion of the exhaust gas recirculates to reuse a portion of the exhaust gas for combustion, the combustion gas may be reduced in flame temperature. Thus, emission amount of nitrogen oxide may be significantly reduced, and combustion efficiency may be improved by prefect combustion. Also, a stable combustion system may be realized on an entire load area from a high power load to a low power load.

The invention claimed is:

1. A combustion apparatus having an air intake preheater, the combustion apparatus comprising:
   a premixing chamber in which external air introduced through an air intake hole 120 is pre-mixed with a combustion gas;
   a blower supplying mixed-gas that is pre-mixed in the premixing chamber to a burner;
   a combustion chamber in which the mixed-gas is burnt by ignition of the burner;
   a heat exchanger in which water is heat-exchanged with combustion heat of the combustion chamber;
   an exhaust gas discharge part through which an exhaust gas passing through the heat exchanger is discharged;
   a duct through which the exhaust gas passing through the exhaust gas discharge part is discharged to the outside; and
   an air intake preheater in which the exhaust gas discharged from the duct through the exhaust gas discharge part is heat-exchanged with the air supplied to the premixing chamber through the air intake hole,
   wherein the preheater comprises a channel defining member in which a plurality of unit plates are stacked on each other in a predetermined distance to adjacently alternately define exhaust gas channels and air intake channels separated from each other therein,
   wherein each of the unit plates is constituted by a first plate and a second plate bonded to each other so that the exhaust gas channel is defined therein, and
   an exhaust gas channel is connected between the first plate and the second plate of the unit plates disposed adjacent to each other by an exhaust gas channel connection member, and
   an exhaust gas introduction tube and an exhaust gas discharge tube are connected to the exhaust gas channel connection member are defined in one side of the unit plate, and
   the air intake channel is defined in a space between the unit plates disposed adjacent to each other.

2. The combustion apparatus of claim 1, wherein first protrusions and second protrusions respectively protrude from the first plate and the second plate on positions corresponding to each other at a predetermined distance so that protruding surfaces contact each other, and each of the first protrusions and the second protrusions between the unit plates disposed adjacent to each other has the same height as that of the exhaust gas channel connection member.

3. The combustion apparatus of claim 2, wherein the air intake preheater comprises a housing in which the channel defining member is mounted therein, and
an air intake hole to which external air is introduced and an air supply tube from which the preheated air is discharged are respectively disposed on upper and lower ends of the housing, and
an exhaust gas introduction hole communicating with the exhaust gas introduction tube and an exhaust gas discharge hole communicating with the exhaust gas discharge tube are respectively defined in an one lower surface and an one upper surface of the housing.

4. The combustion apparatus of claim 1, wherein the exhaust gas introduction tube and the exhaust gas discharge tube are vertically spaced apart from each other in one side surface of the unit plate disposed at one side of the unit plates.

5. The combustion apparatus of claim 4, wherein a fixing member closely attached to an inner surface of the housing to isolate the air intake channels between the unit plates adjacent to each other from each other is disposed on an edge of each of the plurality of unit plates.

6. The combustion apparatus of claim 1, wherein the first plate and the second plate have convex shapes in an opposite direction, and
a first flange part disposed on an outer end of the first plate is coupled to a second flange part disposed on an outer end of the second plate, by welding.

7. The combustion apparatus of claim 1, wherein a flow direction of the exhaust gas passing through the exhaust gas channel and a flow direction of the air passing through the air intake channel are defined in a counterflow direction.

8. The combustion apparatus of claim 7, wherein the premixing chamber is divided into a first passage and a second passage by a partition member therebetween, and
the combustion gas introduced through the gas supply part is supplied to a first gas introduction hole connected to the first channel and a second gas introduction hole connected to the second channel, and
a flow passage of the air and the gas passing through the first passage is in an opened state all the time, and
a flow passage of the air passing through the second passage and a flow passage of the gas, which is connected to the second passage through the second gas introduction hole are opened and closed by a mixed-gas adjusting part.

9. The combustion apparatus of claim 1, wherein the premixing chamber has a venturi shape having a throat part reduced in section area between an inlet and outlet through which the air passes, and
a gas supply part supplying a combustion gas and a recirculation tube are connected to the throat part of the premixing chamber so that a portion of the exhaust gas passing through the heat exchanger is introduced thereto in proportional to a pressure difference according to a flow amount of the mixed-gas passing through the throat part.

* * * * *